US010521408B1

United States Patent
Spruit et al.

(10) Patent No.: US 10,521,408 B1
(45) Date of Patent: Dec. 31, 2019

(54) METHOD AND SYSTEM FOR OPTIMIZATION OF FACETED SEARCH

(71) Applicant: Open Text Corporation, Waterloo (CA)

(72) Inventors: Caroline Spruit, Rotterdam (NL); Petr Olegovich Pleshachkov, Nootdorp (NL)

(73) Assignee: OPEN TEXT CORPORATION, Waterloo (CA)

( * ) Notice: Subject to any disclaimer, the term of this patent is extended or adjusted under 35 U.S.C. 154(b) by 312 days.

(21) Appl. No.: 15/281,207

(22) Filed: Sep. 30, 2016

(51) Int. Cl.
| | |
|---|---|
| *G06F 7/00* | (2006.01) |
| *G06F 16/22* | (2019.01) |
| *G06F 16/81* | (2019.01) |
| *G06F 16/248* | (2019.01) |
| *G06F 16/838* | (2019.01) |

(52) U.S. Cl.
CPC ........ *G06F 16/2228* (2019.01); *G06F 16/248* (2019.01); *G06F 16/81* (2019.01); *G06F 16/838* (2019.01)

(58) Field of Classification Search
CPC ........... G06F 17/30864; G06F 17/3011; G06F 17/3017; G06F 17/30398; G06F 17/30622; G06F 17/30696; G06F 16/40; G06F 16/81; G06F 16/958; G06F 16/215; G06F 16/289; G06F 16/338
See application file for complete search history.

(56) References Cited

U.S. PATENT DOCUMENTS

| | | | |
|---|---|---|---|
| 6,519,586 B2 * | 2/2003 | Anick | G06F 16/951 707/742 |
| 7,246,104 B2 * | 7/2007 | Stickler | G06F 16/9535 |
| 7,653,617 B2 * | 1/2010 | Strohm | G06F 16/951 707/999.003 |
| 8,024,324 B2 * | 9/2011 | Amitay | G06F 16/334 707/715 |
| 8,244,754 B2 * | 8/2012 | Betzler | G06F 16/00 707/769 |
| 8,645,388 B1 * | 2/2014 | Bueche | G06F 16/215 707/742 |
| 8,903,828 B1 | 12/2014 | Bueche et al. | |
| 8,903,829 B1 * | 12/2014 | Bueche | G06F 16/81 707/742 |
| 9,547,714 B2 * | 1/2017 | Ambasta | G06F 16/319 |
| 2003/0088573 A1 * | 5/2003 | Stickler | G06F 16/9535 |
| 2003/0097365 A1 * | 5/2003 | Stickler | G11B 27/32 |
| 2003/0105746 A1 * | 6/2003 | Stickler | G06F 16/93 |
| 2008/0133473 A1 * | 6/2008 | Broder | G06F 16/334 |
| 2009/0327271 A1 * | 12/2009 | Amitay | G06F 16/334 |

(Continued)

*Primary Examiner* — Daniel A Kuddus
(74) *Attorney, Agent, or Firm* — Sprinkle IP Law Group

(57) ABSTRACT

In general, embodiments of the technology relate to a method for servicing requests. The method includes receiving a search request from a client, determining a main path and a conditional subpath associated with the search request, determining a subpath index associated with the main path and the conditional subpath, obtaining, using at least a portion of the search request, a set of subpath index entries from the subpath index, wherein each of the subpath index entries specifies a facet subpath and content associated with the facet subpath, generating a final result using at least a portion of the contents in the set of subpath index entries, and providing the final result to the client.

16 Claims, 9 Drawing Sheets

(56) References Cited

U.S. PATENT DOCUMENTS

| | | | | |
|---|---|---|---|---|
| 2010/0125564 A1* | 5/2010 | Strohm | ............... | G06F 16/951 |
| | | | | 707/709 |
| 2014/0379728 A1* | 12/2014 | Ambasta | ............... | G06F 16/319 |
| | | | | 707/742 |
| 2015/0006500 A1* | 1/2015 | Ambasta | ............... | G06F 16/319 |
| | | | | 707/706 |
| 2015/0227624 A1* | 8/2015 | Busch | ............... | G06F 16/90339 |
| | | | | 707/728 |

* cited by examiner

METHOD AND SYSTEM FOR OPTIMIZATION OF FACETED SEARCH

BACKGROUND

One method for accessing stored content is to use an index (or indices). An index may provide direct access to a particular document(s), for example, in response to a query without requiring traversal of all of the stored content.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-7, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for improving the performance of processing search requests. More specifically, embodiments of the technology relate to modifying a multipath index such that additional content from one or more subpaths may be stored directly in the index. The subpaths stored in the multipath index may be conditional subpaths and facet subpaths, where the facet subpaths include content from the corresponding documents that are indexed by the multipath index. By storing additional content related to one or more facet subpaths in the multipath index, the query processing engine may be able to service various search requests using only content stored in the multipath index. Said another way, the query processing engine may be able to service a search request without retrieving an entire document(s) from storage.

Figure 1:
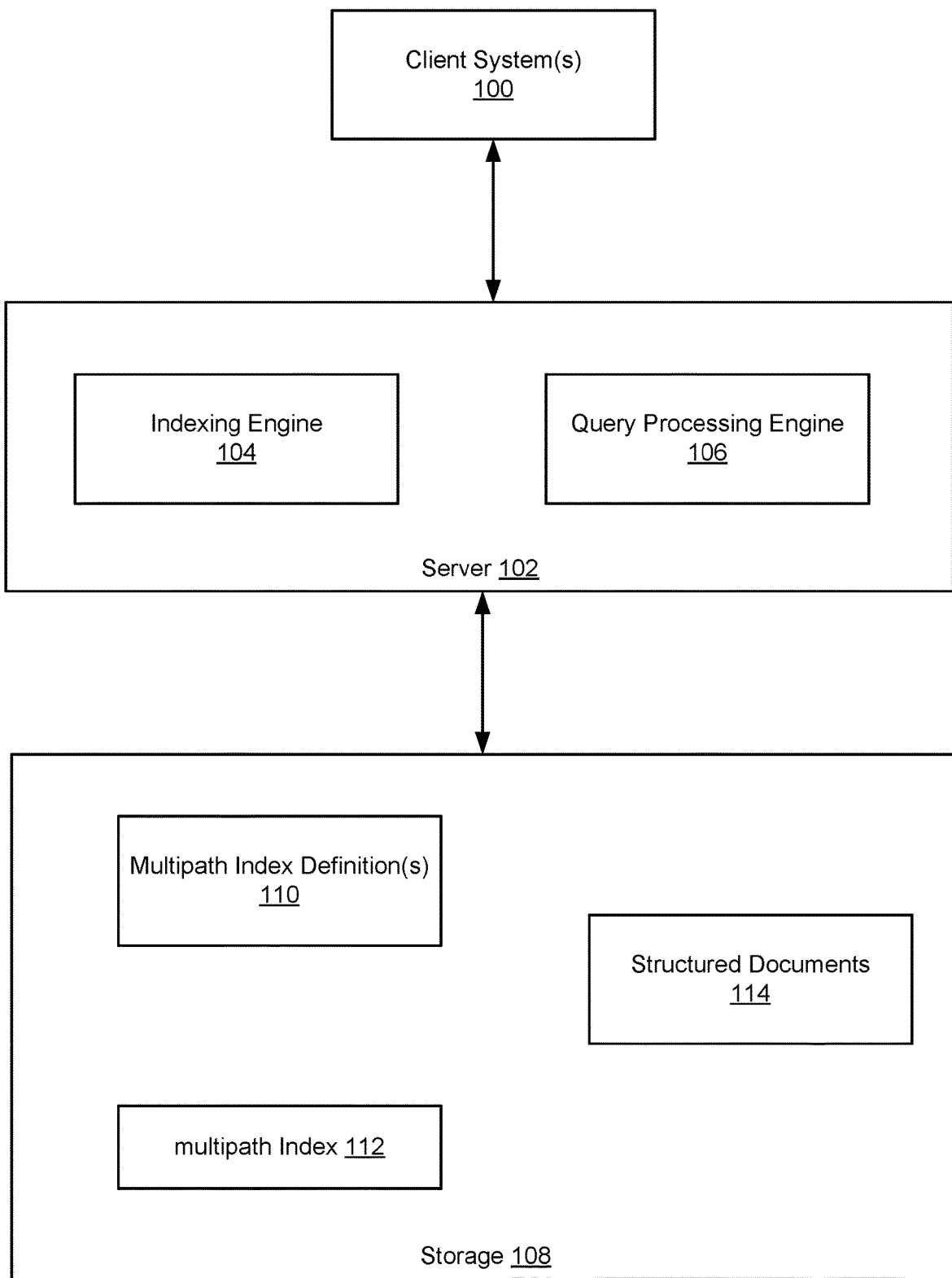
FIG. 1 shows an exemplary system in accordance with one or more embodiments of the technology.

FIG. 1 shows an exemplary system in accordance with one or more embodiments of the technology. The system includes one or more client systems (100), a server (102), and storage (108). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, each client system (100) corresponds to any computing system (see e.g., FIG. 7) that includes functionality to issue search requests (also referred to as queries) to the server (102) and to receive a corresponding response(s) (as referred to as final results, see e.g., FIG. 6) from the server after the search request has been serviced.

Figure 4:
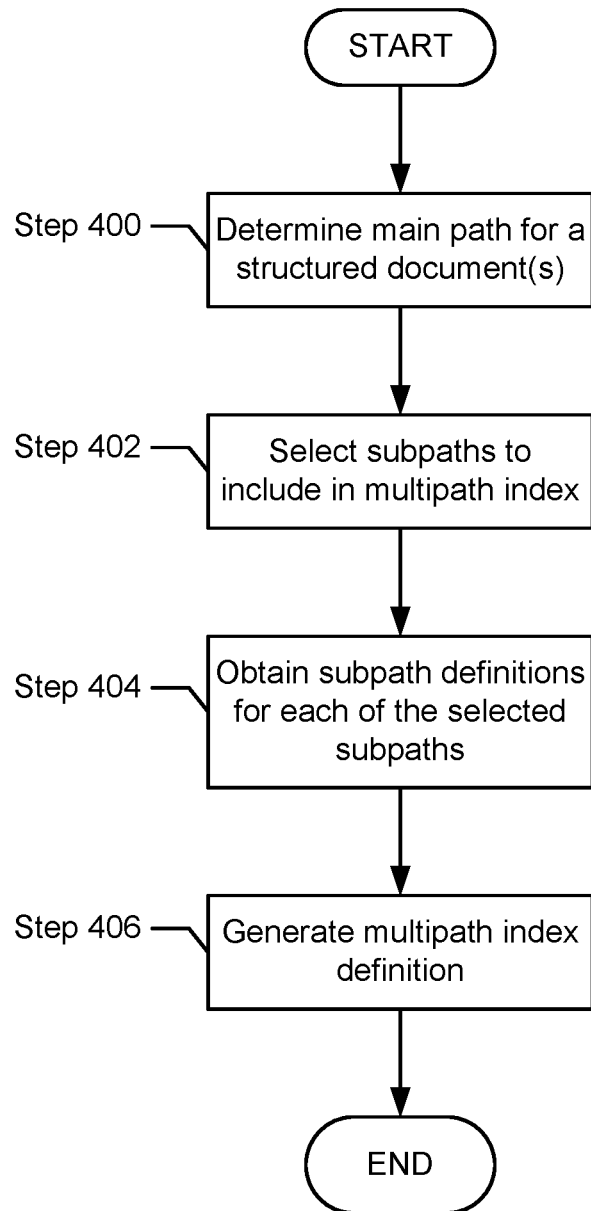
FIG. 4 shows a flowchart for generating a multipath definition in accordance with one or more embodiments of the technology.
Figure 5:
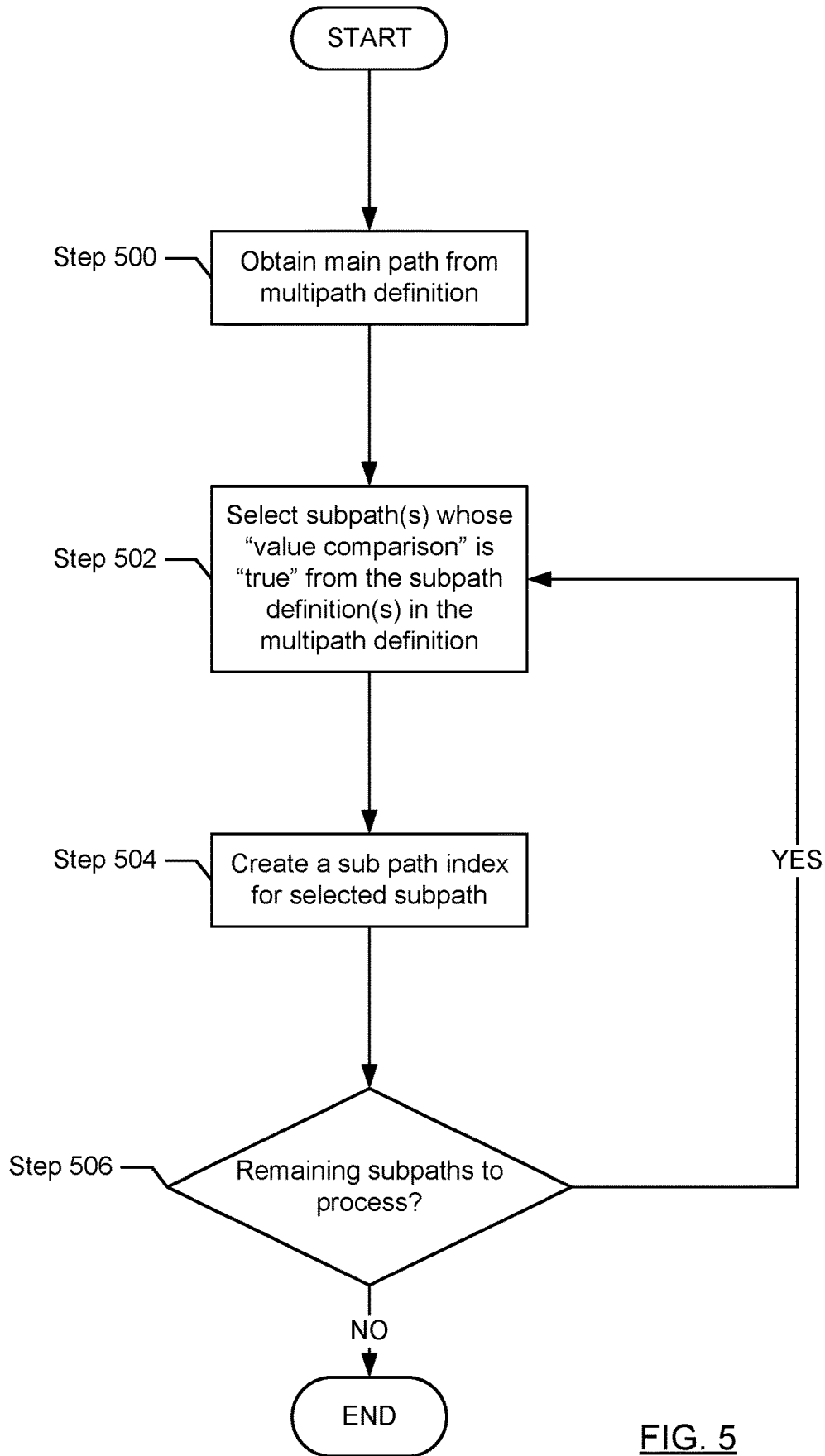
FIG. 5 shows a flowchart for generating a multipath index in accordance with one or more embodiments of the technology.
Figure 6:
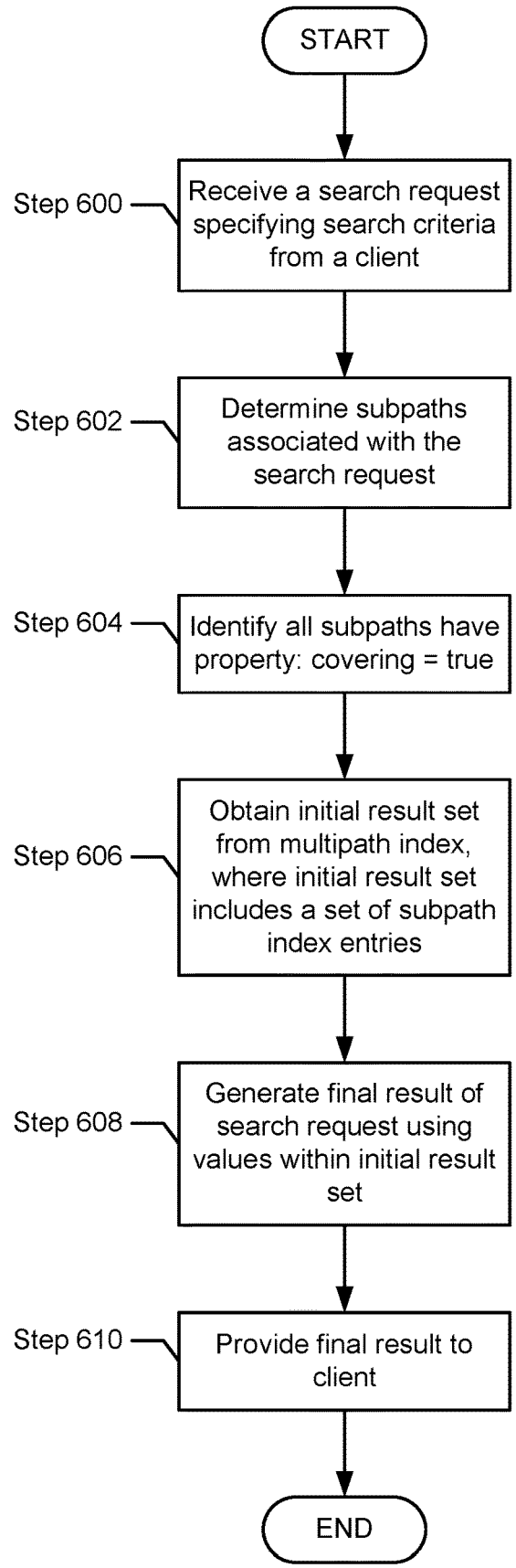
FIG. 6 shows a flowchart for processing a search request in accordance with one or more embodiments of the technology.

Continuing with the discussion of FIG. 1, the server (102) includes functionality to perform all or a portion of the methods shown in FIGS. 4-6. The server may also include functionality to perform various actions (e.g., read, write, delete, modify, send, etc.) on the structured documents (114) (or portions thereof) stored in the storage (108).

In one embodiment of the technology, the server (102) includes a query processing engine (106) and an indexing engine (104). In one embodiment of the technology, the indexing engine (104) is configured to: (i) obtain and manage one or more multipath index definitions (110) and (ii) generate and manage the multipath index. See e.g., FIGS. 4-5. In one embodiment of the technology, the query processing engine (106) is configured to request search requests and to service the search requests. See e.g., FIG. 6.

Figure 7:
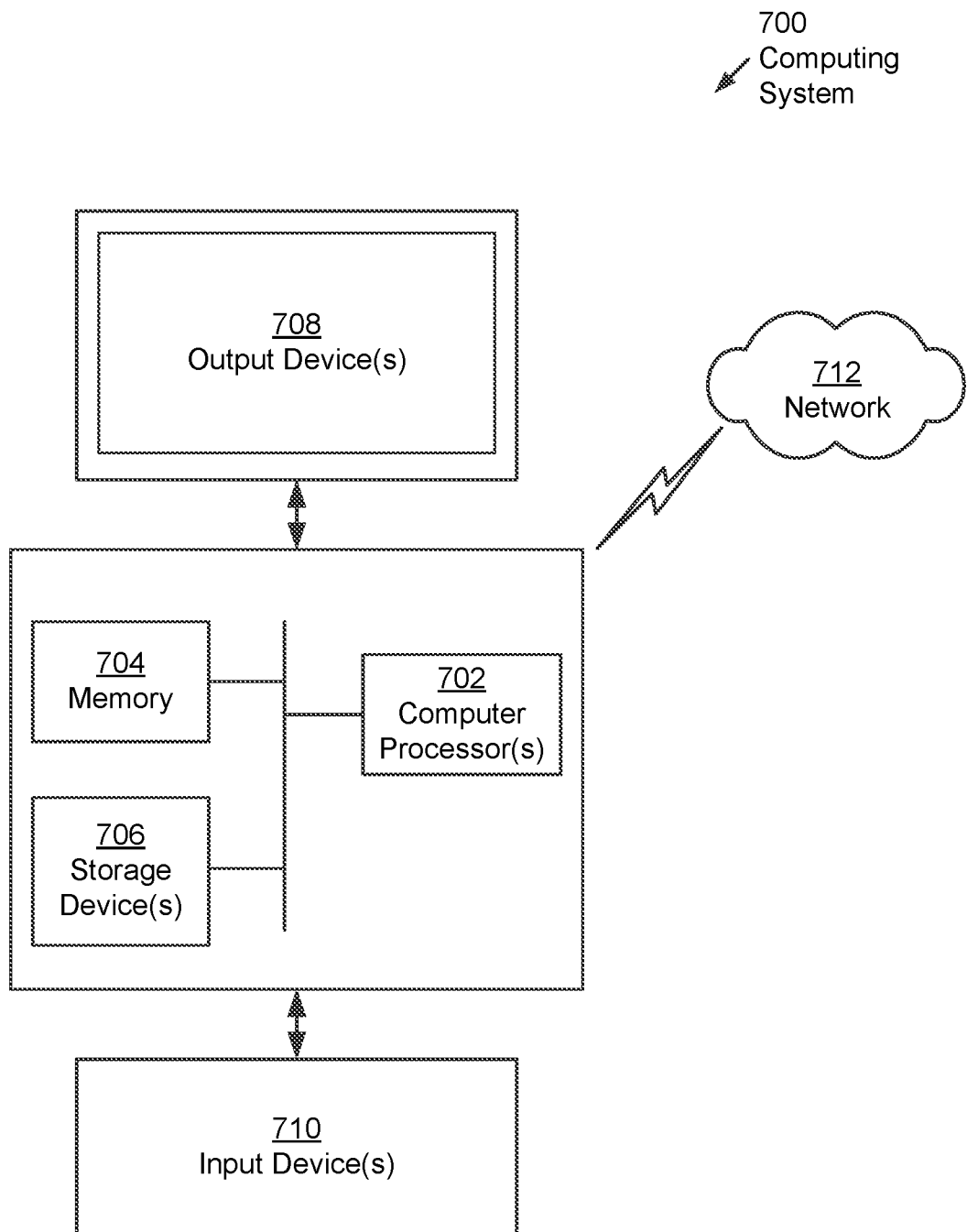
FIG. 7 shows a computing system in accordance with one or more embodiments of the technology.

The server (102) may be implemented using one or more computing systems (see e.g., FIG. 7). Additional detail about the operation of the server (and components thereof) is provided in FIGS. 4-6.

In one embodiment of the technology, the storage (108) includes persistent storage (e.g., solid state storage, magnetic storage, optical storage, any other type of persistent storage or any combination thereof) in which data are stored.

Continuing with the discussion of the storage, the storage may store data using any known or subsequently discovered mechanism. The following describes various examples of the mechanisms that may be used to store data. The examples are not intended to limit the technology. In a first example, the storage (108) may be a set of magnetic hard disks. In a second example, the storage (108) may be implemented using a computer cluster that is executing a distributed file system. In a third example, the storage (108) may be implemented using a network file server and one or more block-storage devices (i.e., as a Storage Area Network)."

In one embodiment of the technology, one or more multipath index definitions (110) are stored in the storage (108). Additional detail about the multipath index definition is provided in FIGS. 2A-2B. In addition, the storage (108) may also store one or more multipath indices (112). Additional detail about the multipath indices is provided in FIGS. 3A-3C.

In one embodiment of the technology, the storage may also include one or more structured documents (118). An example of a structure document is an eXtensible Markup Language (XML) document. In one embodiment of the invention, a structured document may be indexed using a main path and one or more subpaths, where each of the subpaths is defined relative to the main path. Further, each structured document is associated with a node identifier, which may be used to directly access the structure document from storage. In addition, one or more of the subpaths in the structure document may also be associated with a node identifier, which enable direct access of the content associated with the subpath. See e.g., Example 1.

The technology is not limited to the architecture of the system shown in
FIG. 1.

Example 1: Structured Document

The following is an example of a structured document. The example is not intended to limit the scope of the technology.

```
<baseball>
    <master>
        <player>
            <playerid>aardsda01</playerid>
            <birthyear>1981</birthyear>
            <birthcounttry>USA</birthcounttry>
            <birthstate>CO</birthstate>
            <birthcity>Denver</birthcity>
            <namefirst>David</namefirst>
            <namelast>Aardsma</namelast>
        </player> . . .
    </master>
</baseball>
```

In this example, the structured document includes a main path: "/baseball/master/player" and the following subpaths <playerid>, <birthyear>, <birthcounttry>, <birthstate>, <birthcity>, <namefirst>, and <namelast>. Further, as shown in the above example, each of the subpaths is associated with content. For example, for subpath <playerid>, the corresponding content is "aardsda01."

Figure 2A:
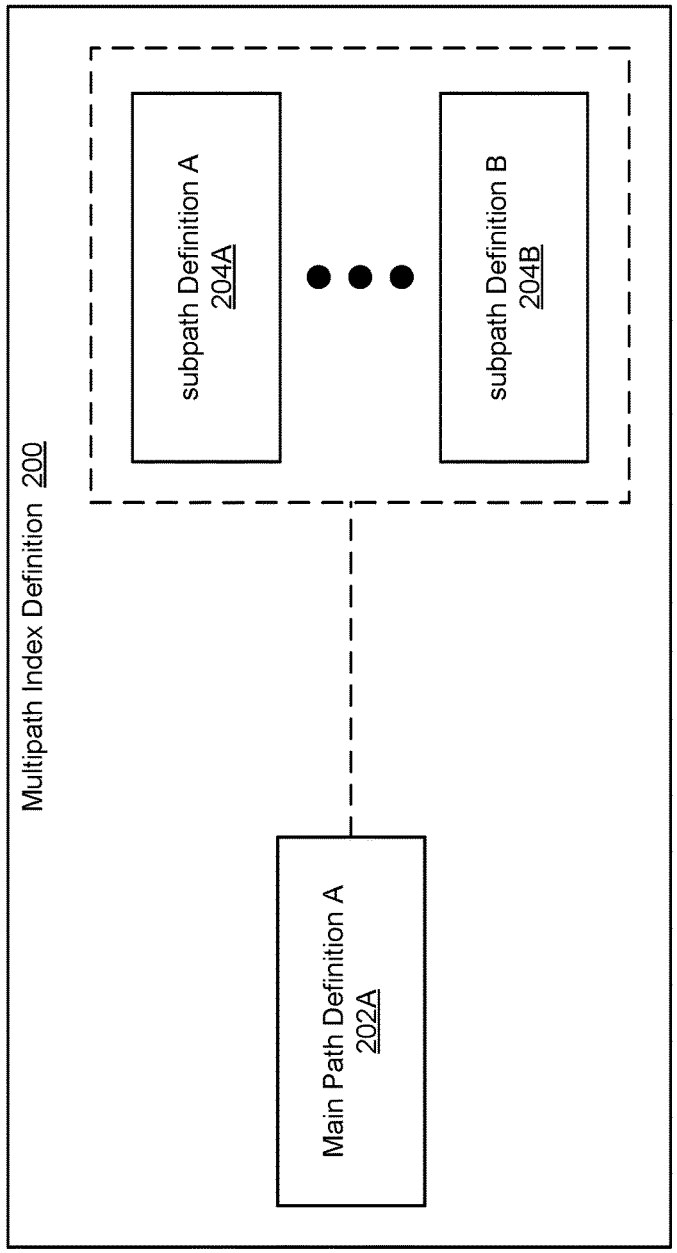
FIG. 2A shows an exemplary multipath index definition in accordance with one or more embodiments of the technology.

Continuing with the discussion of the technology, FIG. 2A shows an exemplary multipath index definition in accordance with one or more embodiments of the technology. The multipath index definition (200) includes a main path definition (202A) that identifies the root element pointed to by the index. The root element may represent a single document, a specific collection of documents and/or an entire database. In addition, the multipath index definition includes one or more subpath definitions (204A, 204B).

Figure 2B:
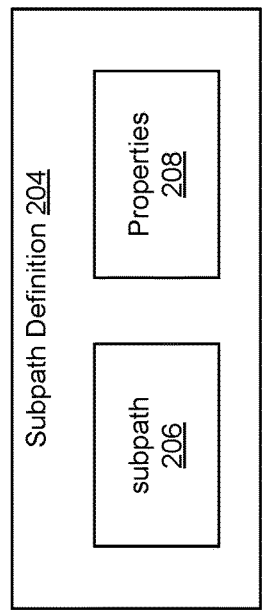
FIG. 2B shows an exemplary subpath definition in accordance with one or more embodiments of the technology.

FIG. 2B shows an exemplary subpath definition in accordance with one or more embodiments of the technology. The subpath definition (204) specifies a subpath (206) (i.e., a subpath defined relative to a main path) and properties (204) associated with the subpath. The properties may include, but are not limited to, (i) value comparison, which indicates that the content associated with the subpath may be used to identify one or more subpath index entries (see e.g., FIG. 3C) and (ii) covering, which indicates that the content associated with the subpath is stored in a subpath index entry (see e.g., FIG. 3C). In one embodiment of the technology, when a subpath only has a property of covering=true (i.e., it is not associated with a property of value comparison=true), the subpath may be used to generate a final result from the initial results but may not be used to generate the initial result set (see e.g., FIG. 6).

Example 2: Main Path and Subpath Definition

The following is an example of a main path definition and a subpath definition for the structured document shown in Example 1. The example is not intended to limit the scope of the technology.

In this example, the main path definition for the structured document shown in Example 1 is: "/baseball/master/player." Further, an exemplary subpath definition for the structured document may be as follows:

|  | Properties | |
| --- | --- | --- |
| subpath | covering | value comparison |
| <birthcountry> | False | True |
| <birthcity> | true | False |
| <birthyear> | true | False |

In this example, the subpath <birthcountry> may be used to identify subpath index entries that should be included in an initial result set. In contrast, the subpaths <birthcity> and <birthyear> will not be used to identity subpath index entries that should be included in an initial result set; rather, the content (also referred to as values) associated with these subpaths will be included in subpath index entries.

Figure 3A:
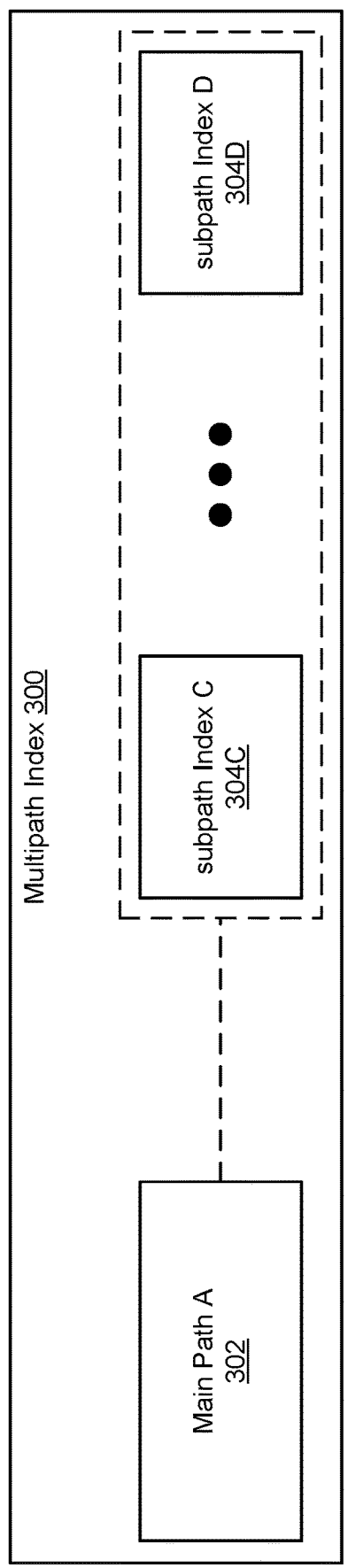
FIG. 3A shows a multipath index in accordance with one or more embodiments of the technology.
Figure 3B:
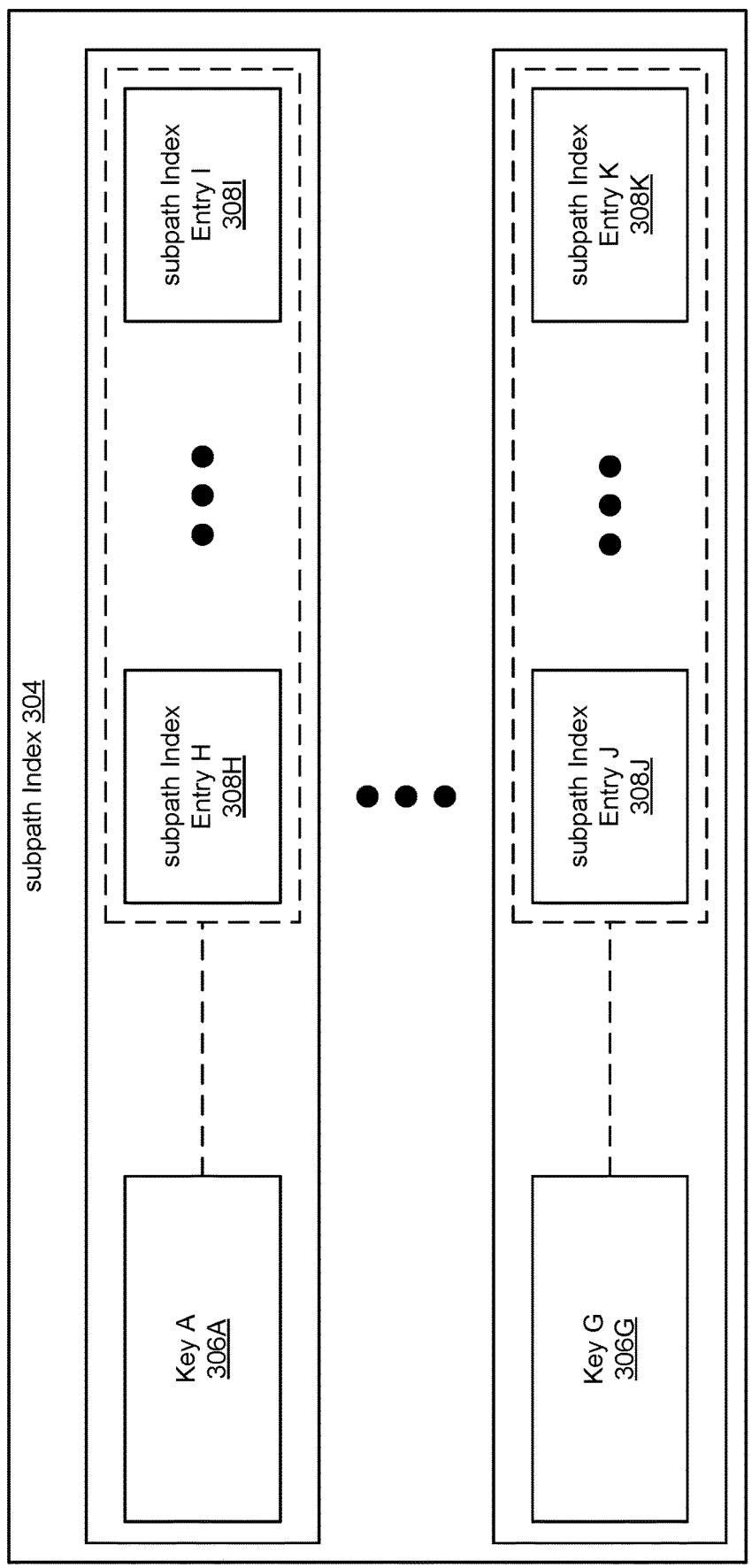
FIG. 3B shows a subpath index in accordance with one or more embodiments of the technology.

FIG. 3A shows a multipath index in accordance with one or more embodiments of the technology. The multipath index (300) includes a main path (302). The main path included in the multipath index correspond to the main paths specified in the main path definition (See e.g., FIG. 2A). The main path is associated with one or more subpath indices (304C, 304D). Each subpath index is generated using one of the subpath index definitions associated with the main path (see e.g., FIGS. 2A, 2B). Referring to FIG. 3B, each subpath index includes one or more keys (306A, 306G), where each key is associated with one or more subpath index entries (308H, 308I 308J, 308K).

In one embodiment of the technology, the key corresponds to content extracted from a document (e.g., a structured document) that is associated with the subpath. In one embodiment of the technology, the key only corresponds to content associated with subpaths that have a property of value comparison.

Figure 3C:
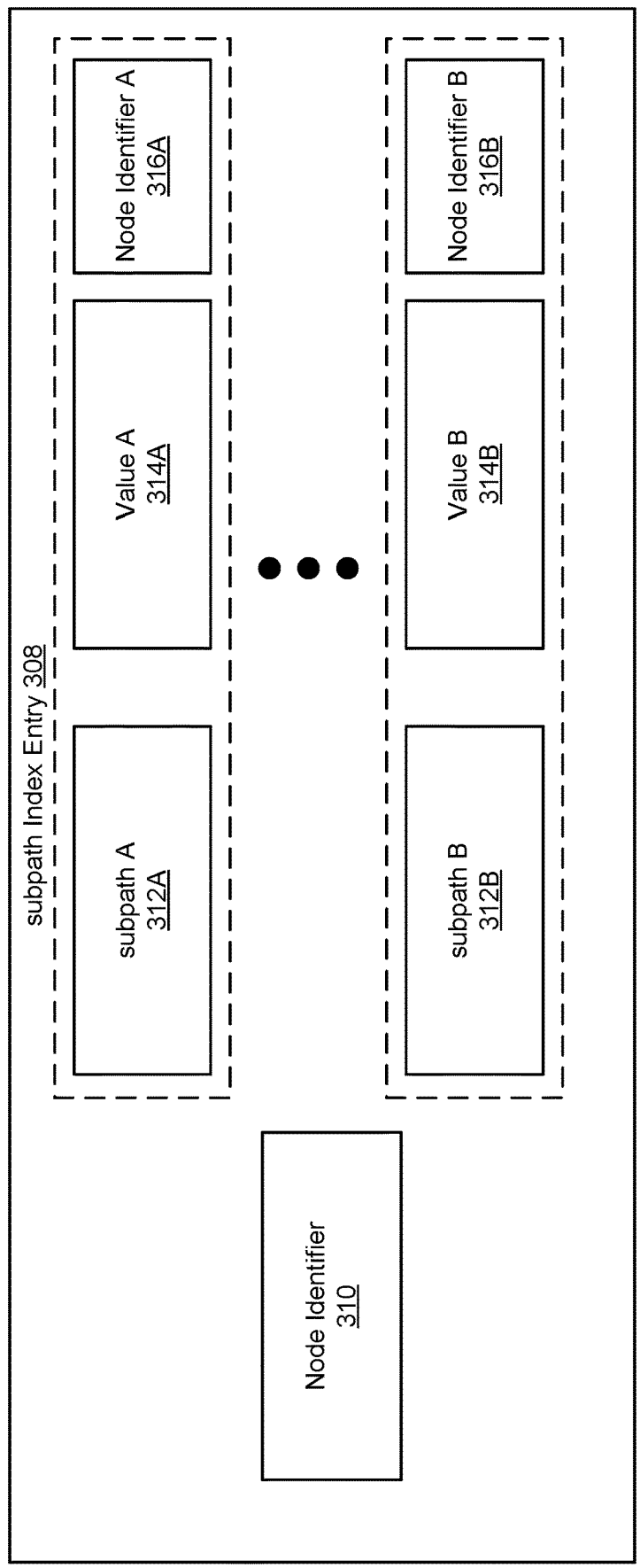
FIG. 3C shows a subpath index entry in accordance with one or more embodiments of the technology.

Referring to FIG. 3C, each subpath index entry (308) in accordance with one or more embodiments of the technology includes: (i) a node identifier (310) for a document (i.e., a document that includes subpath upon which the subpath index is based) and (ii) one or more tuples, where each tuple includes a subpath (312A, 312B), a value (extracted from a document) associated with the subpath (314A, 314B), and a node identifier (316A, 316B) for the subpath (312A, 312B). The node identifiers (310, 316A 316B) allow direct access to the document and/or content within a document (i.e., a document that is stored in the storage, see e.g., FIG. 1).

Example 3: Subpath Index and Subpath Index Entry

The following example is not intended to limit the scope of the technology.

Turning to the example, consider a scenario the storage includes the structured document shown in Example 1 and the multipath index definition shown in Example 2. Based on the above, the following is an exemplary subpath index.

| Key | Subpath Index Entries |
|---|---|
| "USA" | SIE1, SIE2, SIE3, SIE4, SIE5 |
| "Venezuela" | SIE6, SIE7 |
| "Cuba" | SIE3, SIE4, SIE5 |

As shown above, the exemplary subpath index includes keys and corresponding subpath index entries. For example, the key="USA" is associated with five subpath index entries (i.e., SIE1, SIE2, SIE3, SIE4, SIE5). Each of the subpath index entries associated with a given key (e.g., USA) corresponds to a document that includes the subpath (in this example, <birthcountry>) with a value corresponding to the key (in this example, USA).

Assuming that SIE1 is associated with the structured document shown in Example 1, then SIE1 may have the following content:

| Node Identifier | 17592216557571 | |
|---|---|---|
| Subpath | Value | Node Identifier |
| <birthcity> | "Denver" | 17592216557584 |
| <birthyear> | 1981 | 17592216557574 |

In SIE1, the node identifier: "17592216557571" corresponds to the document shown in Example 1. Further, the value "Denver" is extracted aforementioned document from the subpath <birthcity> and the value "1981" is extracted from subpath <birthyear>. Finally, node identifier 17592216557584 is associated with subpath <birthcity> in the document shown in Example 1 and the node identifier 7592216557574 is associated with the subpath <birthyear> in the document shown in Example 1.

FIGS. 4-6 show flowcharts in accordance with one or more embodiments of the technology. While the various steps in these flowcharts are presented and described sequentially, one of ordinary skill in the art will appreciate that some or all of the steps may be executed in different orders, may be combined or omitted, and some or all of the steps may be executed in parallel.

FIG. 4 shows a flowchart for generating a multipath definition in accordance with one or more embodiments of the technology.

In step 400, main path is determined for one or more structured documents. Specifically, the root element of the structured documents is determined. (See e.g., main path in Example 1)

In step 402, one or more subpaths are selected to be included in multipath index. In one embodiment of the technology, some or all of the subpaths associated with a given structured document (or set of structured documents) may be included. Returning to Example 1 above, the structured document includes seven subpaths; however, as shown in Example 2 above, only three subpaths were selected for inclusion in the multipath index definition.

In step 404, subpath definitions are obtained for each of the selected subpaths. More specifically, for each subpath selected in step 402, values for one or more properties for each subpath are specified in order to generate a subpath definition for each subpath, see e.g., FIG. 2).

In step 406, the multipath index definition is generated by combining the obtained main path definition and subpath definitions.

FIG. 5 shows a flowchart for generating multipath index in accordance with one or more embodiments of the technology.

In step 500, the main path is obtained from the multipath definition.

In step 502, a subpath that has a property of "value comparison" set as "true" in the multipath definition is selected. The process in step 502 includes evaluating the subpath path definitions that are associated with the main path obtained in step 500.

In step 504, a subpath index for the selected subpath is created. Creating the subpath index may include: (i) identifying structured documents that include the selected subpath, (ii) for each document identified in (i), obtaining values associated with the selected subpath from the structured documents, (iii) for each document in (i) obtain values associated with subpaths specified in the subpath definition that have a property of covering set to true, (iv) creating a subpath index entry (SIE) for each document identified in (i) that includes the values obtained in (iii), and populating the subpath index with the created SIEs, where each SIE is associated with a key corresponding to a value associated with the subpath selected in step 502. The result of step 504 is a subpath index such as the one shown in Example 3.

In step 506, a determination is made about whether there are any additional subpath definitions to process. If there are additional subpaths to process, the method proceeds to step 502; otherwise, the process ends.

FIG. 6 shows a flowchart for processing a search request in accordance with one or more embodiments of the technology.

In step 600, a search request is received from a client, where the search request includes search criteria. In one embodiment of the technology, the search request may be faceted search. Further, the search may be in an XQuery format. Other query formats and/or languages may be used without departing from the technology.

In step 602, the main path and one or more subpaths associated with the request are determined. This determination may be made, for example, by the query engine based on an evaluation of the search request. The subpaths identified in step 602 may be conditional subpaths or facet subpaths. The request may include any number of conditional subpaths and facet subpaths.

In step 604, for the subpaths identified in step 602, the query engine may determine which, if any of the subpaths, have covering set to true. The processing in step 604 may be performed by evaluating the subpath definitions for the subpaths identified in step 602.

In step 606, the query engine may generate and issue a search query which may be serviced by the multipath index. The search query may specify all or a portion of the criteria included within the search request obtained from the client. More specifically, the search query may specify a subpath and a value, where the subpath has property "value comparison" set to true. This subpath may be referred to as a conditional subpath. In response to the search query, the query engine obtains an initial result set. The initial result set includes zero, one, or more subpath index entries, where each subpath index entry corresponds to document that includes the aforementioned value for the specified subpath. (See e.g., Example 4 below).

In step 608, a final result is generated using the initial result set. Specifically, the final result may be generated by processing the subpath index entries obtained in step 606, where the processing includes using the subpaths and or more values associated with the subpath that are stored in the subpath index entries. In one embodiment of the technology, the subpaths used in step 608 correspond to subpaths, where the subpath has property "covering" set to true. These subpaths may be referred to as facet subpaths.

By using the values that are included within the subpath index entries to generate the final result, the query engine does not need to (or only on a limited basis) access the structured documents (or portions thereof) from the storage. In this manner, there is a reduction in latency related to the servicing of search requests. Said another way, using various embodiments of the technology, search requests may be serviced using sequential I/O requests instead of random I/O requests.

In step 610, the final result is provided to the client.

Example 4: Servicing Search Requests

The following is not intended to limit the scope of the technology. Turning to the example, consider a scenario in which a client issues the following request on a set of structure documents that includes baseball data (see e.g., Example 1), where the multipath index corresponds to the multipath index defined in Example 2 with subpath indices and subpath entries shown in Example 3.

Search Request: Calculate two facet counts, 'Birth City' and 'Birth Year', where birth country='USA'. Only show the counts of the 5 Facet values with the highest count. The search request may take the following format:
let $birthCityFacet:=
<facet-definition name='Birth City' xmlns="http://expath.org/ns/facet">
 <group-by>
  <subpath>birthcity</subpath>
 </group-by>
 <max-values>5</max-values>
</facet-definition>
let $birthYearFacet:=
<facet-definition name='Birth Year' xmlns="http://expath.org/ns/facet">
 <group-by>
  <subpath>birthyear</subpath>
 </group-by>
 <max-values>5</max-values>
</facet-definition>
let $results:=/baseball/master/player[birthcountry='USA']
return facet: count($results, ($birthCityFacet, $birthYearFacet))

Upon receipt of the search request, the query engine may evaluate the search request and issue the following search query to the multipath index:
let $results:=/baseball/master/player[birthcountry='USA']

In the above search request, "birthcountry" is considered a conditional subpath. In response to the search query, the initial set of results includes all subpath index entries that correspond to structured documents where the "birthcountry" specified in the document is "USA". The query engine, which previously determined that the subpaths <birthCity> and <birthYear> have a property "covering" set to true (i.e., that the aforementioned subpaths are facet subpaths), evaluates the subpath index entries in order to determine the facet count values for birthCity and birthYear as specified in the original search request. This processing may be performed without accessing the underlying structured documents. Once the processing is completed, the final result is generated (see below) and sent to the client.

Final Result:
<facets xmlns="http://expath.org/ns/facet">
 <facet name="Birth City">
  <key value="Chicago" count="376"/>
  <key value="Philadelphia" count="356"/>
  <key value="St. Louis" count="296"/>
  <key value="New York" count="267"/>
  <key value="Brooklyn" count="240"/>
 </facet>
 <facet name="Birth Year">
  <key value="1960" count="172"/>
  <key value="1987" count="170"/>
  <key value="1983" count="170"/>
  <key value="1969" count="166"/>
  <key value="1893" count="166"/>
 </facet>
</facets>

Those skilled in the art will appreciate that the technology is not limited to the aforementioned example. Further, the technology may be implemented with non-faceted search requests without departing from the technology.

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (700) may be located at a remote location and connected to the other elements over a network (714). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for servicing requests, comprising:
    receiving a search request from a client, the search request comprising a request to calculate facet count values for a plurality of facets and a maximum number of facet count values to show;
    determining a main path and a conditional subpath associated with the search request;
    determining a plurality of facet subpaths associated with the search request based on each of the plurality of facet subpaths being associated with a first property to indicate that content associated with that facet subpath is stored in a subpath index entry;
    determining a subpath index associated with the main path and the conditional subpath, the subpath index indexing underlying structured documents;
    obtaining, using at least a portion of the search request, a set of subpath index entries from the subpath index, wherein each of the subpath index entries comprises content associated with a facet subpath from the plurality of facet subpaths;
    evaluating the set of subpath index entries to determine the facet count values for the plurality of facets as specified in the search request without accessing the underlying structured documents;
    generating a final result using at least a portion of the content in the set of subpath index entries; and
    providing the final result to the client,
    wherein the subpath index comprises a key-value pair,
    wherein a key in the key-value pair is first content previously extracted from a first document,
    wherein the first content is associated with the conditional subpath, and
    wherein a value in the key-value pair is a first subpath index entry.

2. The method of claim 1, further comprising:
    prior to receiving the search request:
    obtaining a multipath definition; and
    generating a multipath index using the multipath definition.

3. The method of claim 2, wherein the multipath definition comprises a subpath definition, wherein the subpath definition specifies the conditional subpath, a second property associated with the conditional subpath, the plurality of facet subpaths and the first property associated with each of the plurality of facet subpaths.

4. The method of claim 3, wherein the second property indicates that content associated with the conditional subpath is used to identify the set of subpath index entries for an initial result set.

5. The method of claim 1, wherein the search request is a facet search request.

6. The method of claim 1, wherein the first document is an eXtensible Mark-up Language (XML) document.

7. The method of claim 1, wherein at least one subpath index entry of set of subpath index entries comprises second content extracted from the first document prior to receiving the search request.

8. A non-transitory computer readable medium comprising instructions which when executed by a processor perform a method, the method comprising:
    receiving a search request from a client, the search request comprising a request to calculate facet count values for a plurality of facets and a maximum number of facet count values to show;
    determining a main path and a conditional subpath associated with the search request;
    determining a plurality of facet subpaths associated with the search request based on each of the plurality of facet subpaths being associated with a first property to indicate that content associated with that facet subpath is stored in a subpath index entry;
    determining a subpath index associated with the main path and the conditional subpath, the subpath index indexing underlying structured documents;
    obtaining, using at least a portion of the search request, a set of subpath index entries from the subpath index, wherein each of the subpath index entries comprises content associated with a facet subpath from the plurality of facet subpaths;
    evaluating the set of subpath index entries to determine the facet count values for the plurality of facets as specified in the search request without accessing the underlying structured documents;
    generating a final result using at least a portion of the content in the set of subpath index entries; and
    providing the final result to the client,
    wherein the subpath index comprises a key-value pair,
    wherein a key in the key-value pair is first content previously extracted from a first document,
    wherein the first content is associated with the conditional subpath, and
    wherein a value in the key-value pair is a first subpath index entry.

9. The non-transitory computer readable medium of claim 8, the method further comprising:
    prior to receiving the search request:
    obtaining a multipath definition; and
    generating a multipath index using the multipath definition.

10. The non-transitory computer readable medium of claim 9,
    wherein the multipath definition comprises a subpath definition,
    wherein the subpath definition specifies the conditional subpath, a second property associated with the conditional subpath, the plurality of facet subpaths and the first property associated with each of the plurality of facet subpaths.

11. The non-transitory computer readable medium of claim 10, wherein the second property indicates that content associated with the conditional subpath is used to identify the set of subpath index entries for an initial result set.

12. The non-transitory computer readable medium of claim 8, wherein the search request is a facet search request.

13. The non-transitory computer readable medium of claim 8, wherein the first document is an eXtensible Markup Language (XML) document.

14. The non-transitory computer readable medium of claim 8, wherein at least one subpath index entry in the set of the subpath index entries comprises second content extracted from the first document prior to receiving the search request.

15. A system, comprising:
a computer hardware processor;
a memory, accessible to the computer hardware processor, storing a query engine, wherein the query engine executes on the computer hardware processor and is configured to:
  receive a search request from a client, the search request comprising a request to calculate facet count values for a plurality of facets and a maximum number of facet count values to show;
  determine a main path and a conditional subpath associated with the search request;
  determine a plurality of facet subpaths associated with the search request based on each of the plurality of facet subpaths being associated with a first property to indicate that content associated with that facet subpath is stored in a subpath index entry;
  determine a subpath index associated with the main path and the conditional subpath, the subpath index indexing underlying structured documents;
  obtain, using at least a portion of the search request, a set of subpath index entries from the subpath index, wherein each of the subpath index entries comprises content associated with a facet subpath from the plurality of facet subpaths;
  evaluate the set of subpath index entries to determine the facet count values for the plurality of facets as specified in the search request without accessing the underlying structured documents;
  generate a final result using at least a portion of the content in the set of subpath index entries; and
  provide the final result to the client,
  wherein the subpath index comprises a key-value pair,
  wherein a key in the key-value pair is first content previously extracted from a first document,
  wherein the first content is associated with the conditional subpath, and
  wherein a value in the key-value pair is a first subpath index entry.

16. The system of claim 15, wherein the query engine executes on the computer hardware processor and is further configured to:
  obtain a multipath definition; and
  generate a multipath index using the multipath definition,
  wherein the multipath definition comprises a subpath definition,
  wherein the subpath definition specifies the conditional subpath, a second property associated with the conditional subpath, the plurality of facet subpaths and the first property associated with each of the plurality of facet subpaths,
  wherein the second property indicates that content associated with the conditional subpath is used to identify the set of subpath index entries for an initial result set.

* * * * *